Patented Dec. 26, 1933

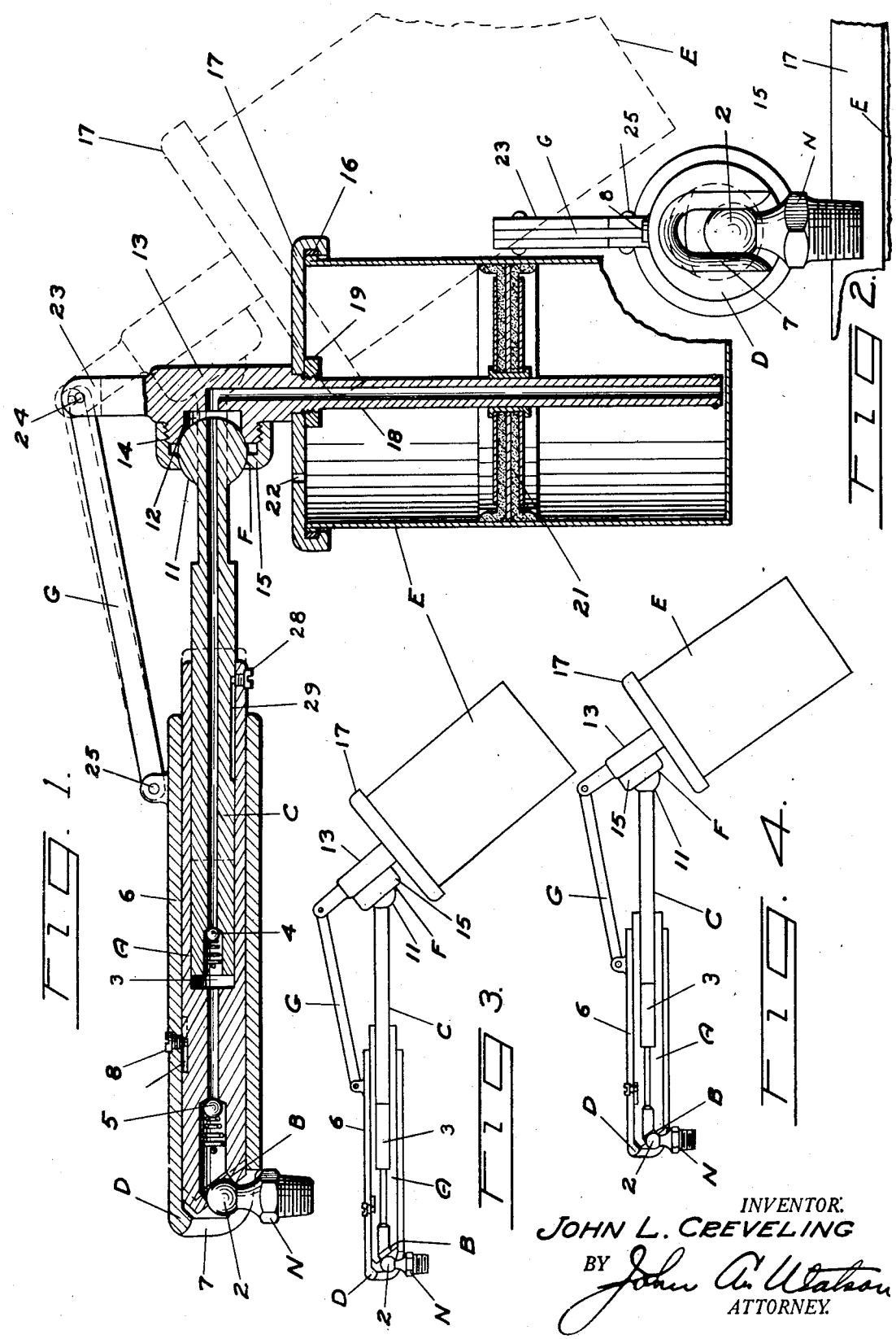

1,941,132

UNITED STATES PATENT OFFICE 1,941,132

LUBRICATING DEVICE

John L. Creveling, near Tucson, Ariz., assignor to The Lubrication Corporation, South Bend, Ind., a corporation of Delaware Application May 4, 1932. Serial No. 609,109

23 Claims. (Cl. 221—47.4)

This invention relates to improvements in lubrication devices and, more particularly, to lubricant guns of the hand type incorporating means for clamping the discharge orifice of the gun in operative engagement with a lubricant nipple or fitting during the discharge of lubricant therethrough.

An object of the invention is to provide a lubricant gun wherein the clamping force applied in clamping the discharge orifice to the fitting is in proportion to the pressure of lubricant to which the fitting is subjected.

Another object is to provide a clamp type lubricant gun having a manually engageable member for supporting the gun in use which, when pressed forwardly, causes the clamping mechanism to function and operates simultaneously to apply pressure to lubricant at the discharge orifice of the gun.

Another object is to provide a lubricant gun which may be easily operated and with which relatively high lubricant pressure may be developed.

Other objects, the advantages, and uses of the invention, will be, or should become apparent after reading the following description and claims and after consideration of the accompanying drawing forming a part of this specification, in which:

Fig. 1 is a sectional view of a lubricant gun constructed in accordance with my invention;

Fig. 2 is a front end elevation of the gun as illustrated in Fig. 1;

Fig. 3 is a schematic view of the lubricant gun shown during initial engagement with the fitting; and Fig. 4 is a view, similar to Fig. 3, showing the lubricant gun with its nozzle clamped upon the fitting.

The lubricant gun selected for illustration herein is of the type wherein the supply of lubricant is self-contained, and comprises, in general, a conduit A having a discharge orifice B at its outer end adapted to partially receive the head of a lubricant nipple or fitting N, a lubricant pump including a cylinder formed in the conduit A and a tubular plunger C, a clamping member D movable relative to the conduit A, a source of lubricant supply comprising a casing E communicating with the tubular plunger C through a pivotal joint F, and a link member G associated with the clamping member D and the casing E for operating the clamping mechanism when the casing E is pivoted about the joint F. The casing E is so constructed as to provide a hand grip by means of which the gun may be supported and operated.

With reference to Fig. 1, the conduit A is formed with a relatively wide mouthed discharge orifice B which is adapted to partially receive the head 2 of the fitting N. The conduit is further formed with an enlarged portion in its bore, at the rearward end thereof, providing a cylinder 3 within which the tubular plunger C is slidably mounted. A check valve 4, of the spring pressed ball type, is disposed within the forward end of the plunger C so that the plunger may act as a piston within the cylinder 3 to force lubricant ahead of the plunger through the discharge orifice B into the fitting N. Another ball check valve 5, of the spring type, is located within the conduit A, adjacent to the discharge orifice B to prevent the return flow of lubricant into the cylinder 3 and to assure a decrease in pressure in the cylinder as the plunger C is moved rearwardly to draw lubricant through the valve 4 into the cylinder for the next succeeding pressure stroke of the plunger.

The clamping member D comprises a sleeve 6 slidably disposed upon the conduit A and formed, at its forward end, with a lubricant nipple or fitting engaging clamp portion 7, of the general type illustrated and described in the United States patent to Herlihy Re. 18,288. A stud screw 8 is disposed through the side walls of the sleeve 6 and into a groove or slot 9 formed on the outer side wall of the conduit A to maintain the sleeve and conduit against rotation relative to one another and to assure proper alignment of the clamping portion 7 of the sleeve 6 and the discharge orifice B of the conduit.

The rearward end of the tubular plunger or piston C terminates in a relatively large spherical head 11 which is partially received within a recess 12 formed in the side wall of an elongated member 13. The member 13 forms a support for the casing E. That portion of the member 13 about the mouth of the recess 12 is externally threaded at 14 to receive a screw threaded annular cap 15 which is arranged to encompass and bear against the remote spherical surface of the head 11 to hold the opposite side of the head against the adjacent walls of the recess 12 and to provide a lubricant tight pivotal joint between the plunger C and the member 13 with its lubricant supply casing E.

The lubricant casing E is secured by bayonet interlock 16 upon an annular plate 17 forming a closure for the upper end of the casing. The plate 17 is disposed over an elongated and depending tubular portion 18 of the member 13 and secured thereto by a lock nut 19. The portion 18 of the member 13 communicates at its upper end with the recess 12 and at its lower end with the innermost end of the casing E. A follower piston 21 is slidably disposed upon the member 18 and adapted to engage with the inner side walls of the casing so that as lubricant is withdrawn into the cylinder 3 by operation of the pump mechanism the piston may follow the lubricant under atmospheric pressure. For this purpose, a bleed opening 22 is provided through the plate 17. The member 13 is further formed with an upwardly extending portion 23 which is pivotally connected at its outer end 24 with one end of the link G. The forward end of the link is pivotally connected at 25 to the sleeve 6.

In the schematic view of Fig. 3, I have illustrated my improved gun as it appears during initial engagement with the head 2 of the fitting N. The casing E, forming the source of lubricant supply and the manually engageable support and operating member, is pivoted rearwardly upon the joint F and link G to draw the plunger C toward the rear of the cylinder 3 and to permit the nozzle of the gun to be moved laterally over the head of the fitting so that the head may be partially received within the discharge orifice B. The cylinder 3, ahead of the plunger C, contains lubricant drawn through the tubular plunger and the valve 4 upon the preceding movement of the casing and support E to the position shown in the drawing. When proper registration between the discharge orifice B of the gun and the head 2 of the fitting has been established, the operator may press forwardly upon the casing E, as it is held in the hand, to cause the parts to assume the position shown in Fig. 4. But very slight forward movement of the casing E is necessary to cause the parts to assume this position, which is brought about by the forward movement of the plunger C in the cylinder 3, to place the lubricant in the cylinder under slight pressure, thus resisting further unretarded forward movement of the plunger. During this function of the gun, the link G will be drawn rearwardly by the rotation of the portion 23 about the axis of the head 11 forming the joint F, to cause the sleeve 6 with its clamping member D to move with respect to the conduit A and clamp the head to the fitting in engagement with the discharge orifice B.

Continued forward movement of the casing or supporting member E will cause relatively higher pressures to be developed within the cylinder 3 by pressure upon the plunger C, so that lubricant will be forced through the valve 5 and into the fitting where it may be conducted to the bearing or other parts with which the fitting is associated. As the pressure in the cylinder 3 increases, the force resisting forward movement of the plunger will also increase so that forces in proportion to the lubricant pressure in the cylinder 3 will be transmitted through the link G to the sleeve 6, and thus the clamping action between the portion 7 of the clamping member D and the discharge orifice B will increase in proportion to the increase in the pressure of the lubricant developed by the plunger C within the cylinder of the conduit A. In full lines of Fig. 1, I have illustrated the gun substantially at the completion of its pressure stroke; and, in dotted lines, I have illustrated the parts substantially as shown in Fig. 3 and as they appear during initial engagement of the gun with the fitting.

If lubricant in excess of that delivered during one forward pressure stroke of the plunger C is desired for servicing the fitting, additional discharge of lubricant may be brought about by moving the casing E rearwardly upon its pivotal connection 24 with the link G, followed by a forward movement of the casing or support to produce another pressure stroke. This function may be repeated as many times as desired to satisfactorily service the fitting.

During the rearward movement of the plunger C in the cylinder 3, the valve 5 will close due to the force of its associated spring and to atmospheric pressure, and lubricant may be drawn from within the casing E through the member 13 into the cylinder C through the valve 4, to provide a charge of lubricant in the cylinder 3 which may be discharged upon the following pressure stroke of the plunger.

In order that the conduit A may be drawn rearwardly when the device is caused to assume the dotted line position in Fig. 1, should friction or other cause prevent suction ahead of the plunger C to draw the conduit therewith, I have provided a stud screw 28 extending through the rearward side wall of the conduit A which is arranged to enter an elongated groove or slot 29 formed in the outer wall of the conduit similar to the groove 9. With this arrangement the rearward movement of the conduit relative to the tubular member 6 is assured although it is contemplated that under normal conditions the suction created by the rearward movement of the plunger C will be ample to draw the conduit A rearwardly therewith.

It will be noted that the cross sectional area of the cylinder 3 is greater than the area of the discharge orifice B. This arrangement assures proper clamping function between the conduit A and the clamping member D.

I have thus provided a lubricant gun of the clamp type which may be operated by the simple expedient of moving the casing or hand grip, by means of which the gun is supported and moved forwardly to simultaneously clamp the nozzle of the gun upon the fitting head and to apply pressure to lubricant within the gun so that it may be forcefully discharged into the fitting.

It is to be understood that the embodiments of the invention herein set forth are presented for the purpose of illustration only, and various changes may be made without departing from the spirit of the invention and the scope of the claims.

I claim:

1. A lubricant gun of the clamp type comprising a lubricant pump including a conduit having a discharge orifice and formed with a cylinder communicating with said discharge orifice, and a plunger mounted for reciprocation in said cylinder, said plunger having a bore therethrough, a check valve disposed in said bore, a clamping member associated with said conduit and adapted to move relative thereto for engagement with a lubricant nipple whereby the pump may be clamped in engagement with said nipple, and means for operating said plunger and for simultaneously moving said clamping member relative to said conduit.

2. A lubricant gun of the clamp type comprising a lubricant pump, having a plunger, said pump having a discharge nozzle for engagement with a lubricant receiving fitting, a clamping member mounted for movement relative to said pump for clamping said pump upon said fitting, and manually operable means including a member pivotally connected to said plunger for operating said pump and for simultaneously operating said clamping member.

3. A lubricant gun of the clamp type comprising a lubricant pump, having a plunger, said pump having a discharge nozzle for engagement with a lubricant receiving fitting, a clamping member mounted for movement relative to said pump for clamping said pump upon said fitting, and manually operable means including a member pivotally connected to said plunger and mechanically connected with said clamping member for operating said pump and for simultaneously operating said clamping member.

4. A lubricant gun of the clamp type comprising a lubricant pump having a plunger, said pump being provided with a discharge nozzle adapted to engage with a lubricant receiving fitting, a clamping member adapted to clamp said pump upon said fitting, and a manually operable member pivotally mounted on said pump plunger and connected with said clamping member for distributing force applied to said member between said plunger and said clamping member to simultaneously clamp the discharge nozzle upon a fitting and to operate said pump.

5. A lubricant gun of the clamp type comprising a lubricant pump having a plunger, said pump being provided with a discharge nozzle adapted to engage with a lubricant receiving fitting, a clamping member adapted to clamp said pump upon said fitting, a manually operable member pivotally mounted on said pump plunger and connected with said clamping member for distributing force applied to said member between said plunger and said clamping member to simultaneously clamp the discharge nozzle upon a fitting and to operate said pump, and means for admitting lubricant to said pump through said plunger.

6. A lubricant gun of the clamp type comprising a lubricant pump having a plunger, said pump being provided with a discharge nozzle adapted to engage with a lubricant receiving fitting, a clamping member adapted to clamp said pump upon said fitting, a manually operable member pivotally mounted on said pump plunger and connected with said clamping member for distributing force applied to said member between said plunger and said clamping member to simultaneously clamp the discharge nozzle upon a fitting and to operate said pump, and means for admitting lubricant to said pump through said plunger and said manually operable member.

7. A lubricant gun including a lubricant pump comprising a hollow body having a discharge nozzle at one end, a plunger mounted for reciprocation in said body, a clamping member slidably mounted on said body and adapted to clamp said pump upon a lubricant receiving fitting when said clamping member is moved rearwardly on said body, manually operable means for simultaneously moving said plunger forwardly in the body and for moving said clamping member rearwardly to operate said pump and said clamping member, and positive means cooperating with said last-named means for moving said clamping member away from said discharge nozzle.

8. In a lubricant feeding apparatus, a lubricant pump having a movable pressure producing member, a discharge nozzle for said pump, a clamping member associated with said nozzle for engaging with a lubricant receiving fitting, means mechanically connected with said movable member of said pump and with said clamping member for simultaneously operating the pump and clamping member, and positive means cooperating with said last-named means for moving said clamping member away from said discharge nozzle.

9. In a lubricant feeding apparatus, a lubricant pump having a movable pressure producing member, a discharge nozzle for said pump, a clamping member associated with said nozzle for engaging with a lubricant receiving fitting, means mechanically connected with said movable member of said pump and with said clamping member for distributing force equally to said members to simultaneously operate the pump and the clamping member, and positive means cooperating with said last-named means for moving said clamping member away from said discharge nozzle.

10. In a lubricant feeding apparatus, a lubricant pump having a movable pressure producing member, a discharge nozzle for said pump, a clamping member associated with said nozzle for engaging with a lubricant receiving fitting, means mechanically connected with said movable member of said pump and with said clamping member including a manually operable member for simultaneously operating the pump and clamping member, and positive means cooperating with said last-named means for moving said clamping member away from said discharge nozzle.

11. In a lubricant feeding apparatus, a lubricant pump having a movable pressure producing member, a discharge nozzle for said pump, a clamping member associated with said nozzle for engaging with a lubricant receiving fitting, and means mechanically connected with said movable member of said pump and with said clamping member for simultaneously operating the pump and clamping member, said means including a member pivotally connected to said movable member.

12. In a lubricant feeding apparatus, a lubricant pump having a movable pressure producing member, a discharge nozzle for said pump, a clamping member associated with said nozzle for engaging with a lubricant receiving fitting, and means mechanically connected with said movable member of said pump and with said clamping member for simultaneously operating the pump and clamping member, said means including a member pivotally connected to said movable member and forming a conduit with said movable member through which lubricant may be admitted to said pump.

13. In a lubricant feeding apparatus, a lubricant pump having a movable pressure producing member, a discharge nozzle for said pump, a clamping member associated with said nozzle for engaging with a lubricant receiving fitting, means mechanically connected with said movable member of said pump and with said clamping member for simultaneously operating the pump and clamping member, said means including a member pivotally connected to said movable member and forming a conduit with said movable member through which lubricant may be admitted to said pump, and a casing forming a source of lubricant supply carried by said pivotally connected member.

14. In a lubricant feeding apparatus, a lubricant pump having a plunger mounted for reciprocation and through which lubricant may be admitted to the pump, and pump operating means including a member pivotally connected to the plunger and a casing forming a source of lubricant supply communicating through said operating member with the plunger.

15. In a lubricating gun, a lubricant container, a conduit extending into said container, a hollow plunger pivotally secured to said conduit, a nozzle associated with said plunger, and means effective upon turning movement of said container relative to said plunger for moving said plunger relative to said nozzle.

16. In a lubricating gun, a lubricant container, a conduit extending into said container, a hollow plunger pivotally secured to said conduit, a hollow nozzle within which said plunger is telescoped and means effective upon turning movement of said container relative to said plunger for moving said plunger relative to said nozzle, and for pumping lubricant from said container to said nozzle.

17. A lubricating gun comprising a tubular member, a conduit mounted in said tubular member, a pump plunger associated with said conduit, and a single means for moving said tubular member relative to said conduit and for operating said pump plunger, said means comprising a lever.

18. A lubricant discharge nozzle comprising, a lubricant conduit having a discharge member at one end, a clamping member associated with said conduit for clamping said discharge member against a lubricant receiving fitting, means forming a hand grip mounted at the opposite end of said conduit and providing a portion embracing the same, and means associated with said clamping member and said hand grip for operating said clamping member upon movement of said hand grip relative to said conduit.

19. A lubricant discharge nozzle comprising, a lubricant conduit having a discharge member at one end, a clamping member associated with said conduit for clamping said discharge member against a lubricant receiving fitting, a member forming a hand grip pivotally mounted upon the opposite end of said conduit and comprising a continuation of said conduit, and means associated with said clamping member and said hand grip member for operating said clamping member upon pivotal movement of said hand grip member relative to said conduit.

20. A lubricant discharge nozzle comprising, a lubricant conduit having a discharge member at one end, a clamping member associated with said conduit for clamping said discharge member against a lubricant receiving fitting, a member forming a hand grip pivotally mounted upon the opposite end of said conduit and on an axis intersecting the axis of said conduit and comprising a continuation of said conduit, means associated with said clamping member and said hand grip member for operating said clamping member upon pivotal movement of said hand grip member relative to said conduit, and means for interconnecting said continuation of said conduit in said hand grip member with a source of lubricant supply.

21. A lubricant discharge nozzle comprising, a lubricant conduit formed with a discharge member at one end, a clamping member mounted for movement along the axis of said conduit for engagement with a lubricant receiving fitting upon registration of said discharge member with said fitting, a member, forming a hand grip pivotally mounted on said conduit and forming a continuation thereof, and a member associated with said clamping member and pivotally connected to said hand grip member on an axis parallel with but spaced away from the axis of the pivoted joint between said conduit and said hand grip member whereby pivotal movement of the hand grip may cause relative right line movement between said conduit and said clamping member.

22. A lubricant discharge nozzle comprising, a lubricant conduit formed with a discharge member at one end, a clamping member mounted for movement along the axis of said conduit for engagement with a lubricant receiving fitting upon registration of said discharge member with said fitting, a member forming a hand grip, pivotally mounted on said conduit and forming a continuation thereof, a member associated with said clamping member and pivotally connected to said hand grip member on an axis parallel with but spaced away from the axis of the pivotal joint between said conduit and said hand grip member whereby pivotal movement of the hand grip may cause relative right line movement between said conduit and said clamping member, and means for establishing predetermined friction between said conduit and said hand grip member.

23. A lubricant discharge nozzle comprising, a lubricant conduit having a discharge member at one end, a clamping member associated with said conduit for clamping said discharge member against a lubricant receiving fitting, means forming a hand grip pivotally mounted upon said conduit about an axis intersecting the axis of said conduit, and means associated with said clamping member and said hand grip for operating said clamping member upon pivotal movement of said hand grip relative to said conduit.

JOHN L. CREVELING.